(12) United States Patent
Shoji et al.

(10) Patent No.: US 6,734,641 B2
(45) Date of Patent: May 11, 2004

(54) DEVICE FOR TURNING ON LIGHT AND ILLUMINATION APPARATUS

(75) Inventors: Hiroyuki Shoji, Hitachi (JP); Hideki Miyazaki, Hitachi (JP); Yasuyuki Kojima, Hitachi (JP); Kenji Kawabata, Ome (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/368,444

(22) Filed: Feb. 20, 2003

(65) Prior Publication Data

US 2003/0127997 A1 Jul. 10, 2003

Related U.S. Application Data

(62) Division of application No. 09/654,083, filed on Sep. 1, 2000, now Pat. No. 6,570,343.

(30) Foreign Application Priority Data

Feb. 24, 2000 (JP) ..................................... 2000-048162

(51) Int. Cl.⁷ ............................................. H05B 37/02
(52) U.S. Cl. ................. 315/291; 315/194; 315/224; 315/DIG. 4; 315/308
(58) Field of Search ............................ 315/291, 194, 315/224, DIG. 4, 308, 307, 209 R, 316

(56) References Cited

U.S. PATENT DOCUMENTS

| | | | |
|---|---|---|---|
| 4,553,070 A | 11/1985 | Sairanen et al. | 315/209 R |
| 5,192,896 A | 3/1993 | Qin | 315/219 |
| 5,365,154 A | 11/1994 | Schneider et al. | 318/103 |
| 5,396,155 A | 3/1995 | Bezdon et al. | 315/291 |
| 5,481,449 A | 1/1996 | Kheraluwala et al. | 323/259 |
| 5,545,955 A | 8/1996 | Wood | 315/224 |
| 5,757,145 A * | 5/1998 | Johnson et al. | 315/308 |
| 5,872,429 A * | 2/1999 | Xia et al. | 315/194 |
| 5,965,985 A | 10/1999 | Nerone | 315/209 R |
| 6,002,214 A | 12/1999 | Ribarich | 315/194 |
| 6,037,722 A | 3/2000 | Moisin | 315/224 |
| 6,133,696 A * | 10/2000 | Tavares et al. | 315/DIG. 4 |
| 6,191,563 B1 * | 2/2001 | Bangerter | 315/291 |

FOREIGN PATENT DOCUMENTS

| | | |
|---|---|---|
| DE | 40 01 265 | 7/1991 |
| DE | 101 28 258 | 12/2002 |
| EP | 0 200 016 | 11/1986 |
| EP | 0 488 478 | 6/1992 |
| EP | 0488478 | 6/1992 |
| EP | 0 634 842 | 1/1995 |
| IT | 1 244 817 | 9/1994 |
| JP | 57 101440 | 6/1982 |
| JP | 8-37092 | 2/1996 |
| JP | 8-96982 | 4/1996 |
| JP | 08 096982 | 4/1996 |

* cited by examiner

Primary Examiner—Don Wong
Assistant Examiner—Ephrem Alemu
(74) Attorney, Agent, or Firm—Antonelli, Terry, Stout & Kraus, LLP

(57) ABSTRACT

A device for turning on light allowing the brightness of an inverter-type illumination apparatus to be adjusted without having to install an additional oscillation circuit. The device comprises an active converter which generates a DC voltage from the commercial AC voltage and an inverter which switches the generated DC voltage, includes a capacitor connected in parallel with a discharge tube to be lighted, and supplies a high-frequency current to the discharge tube via a resonance circuit whose resonance frequency is determined according to the equivalent impedance of the discharge tube. The active converter has a triac adjusting the DC voltage, and switching elements of the inverter perform self-oscillation under control of the phase of the resonance current flowing through the resonance circuit.

11 Claims, 19 Drawing Sheets

DEVICE FOR TURNING ON LIGHT AND ILLUMINATION APPARATUS

CROSS-REFERENCE TO RELATED APPLICATION

This application is a division of application Ser. No. 09/654,083 filed on Sep. 1, 2000 now U.S. Pat. No. 6,570,343, the contents of which are hereby incorporated herein by reference in their entirety.

BACKGROUND OF THE INVENTION

The present invention relates to a device for turning on light, and more particularly to an inverter-type device for turning on light and an inverter-type illumination apparatus.

Recently, an inverter-type illumination apparatus, which converts the DC voltage obtained from the commercial AC voltage to a high-frequency AC voltage for application to a discharge tube, has been widely used. The discharge tube of this illumination apparatus may be a standard fluorescent lamp with a filament or a non-electrode fluorescent lamp without a filament in which a plasma is generated by the line of magnetic force emitted from an excitation coil. It is known that this type of inverter-type illumination apparatus has a light adjustment function. For example, the circuit for turning on light disclosed in JP-A-8-37092 changes the frequency of the AC current, supplied to the resonance circuit, to change the amount of current flowing into the discharge tube-for brightness adjustment.

The conventional device for turning on light described above uses a variable-frequency oscillation circuit, which generates the square wave of a desired frequency, to change the frequency of the current to be supplied to the resonance circuit. This additional circuit increases the number of parts and the cost. In addition, changing the frequency in order to change the brightness of the illumination apparatus requires the user to operate the device for turning on light within the illumination apparatus. Therefore, the brightness of the illumination apparatus cannot be adjusted remotely.

SUMMARY OF THE INVENTION

It is an object of the present invention to provide a function to adjust the brightness of an inverter-type illumination apparatus without having to install an additional oscillation circuit. It is another object of the present invention to provide a function to remotely adjust the brightness of an inverter-type illumination apparatus.

The above objects are achieved by a device for turning on light comprising DC (Direct Current) voltage generating means for generating a DC voltage from a commercial AC (Alternate Current) voltage; and first switching means for switching the generated DC current and for supplying a high-frequency current to a discharge tube via first resonance circuit means which includes a capacitor connected in parallel with the discharge tube to be lighted and whose resonance frequency is determined according to an equivalent impedance of the discharge tube, wherein the DC voltage generating means has control means for adjusting a value of the DC voltage and wherein a switching of the switching means is controlled by a phase of a resonance current flowing through the first resonance circuit means.

When the DC voltage supplied to the first switching means is changed to change the amplitude of the high-frequency AC voltage in the device for turning on light, the value of the current flowing through the discharge tube also changes. Because the discharge tube has negative resistance characteristics, the equivalent impedance of the discharge tube also changes. Therefore, the resonance frequency of the first resonance circuit changes accordingly, the switching frequency of the first switching means changes, and the frequency of the AC current flowing through the first resonance circuit changes. When the frequency of the AC current changes, the impedance of the capacitor in parallel with the discharge tube changes, the ratio between the current flowing through the discharge tube and the current flowing through the capacitor changes, and the brightness of the discharge tube changes. That is, simply changing the DC voltage to be supplied to the first switching means automatically changes the frequency of the high-frequency AC current supplied to the resonance circuit and the discharge tube, changing the current flowing through the discharge tube, thus changing the brightness. Therefore, an additional oscillator defining the switching frequency of the switching means required in the conventional device is no more needed.

The first switching means comprises two switching elements which are alternately conducted or non-conducted when a control signal obtained from the resonance current flowing through the first resonance circuit means is applied, the two switching elements connected in series; and means for changing a phase of the control signal. Controlling the timing in which the switching elements conduct prevents the switching elements from being heated by the charge and discharge of the parasitic capacitance.

The DC voltage generating means comprises a first capacitor which receives a current from the commercial AC voltage to establish the DC voltage; and second switching means for supplying the current from the commercial AC voltage to second resonance circuit means and for moving a charge accumulated in the second resonance means to the first capacitor, wherein the second switching means and the first switching means are the same. This configuration enables the DC voltage supplied to the switching means to be amplified.

The above objects are achieved by a device for turning on light with a communication function, comprising an inverter generating a high-frequency current from a commercial AC voltage supplied from a lamp line and supplying the current to a discharge tube to be lighted; and a communication interface communicating with external units via the lamp line, wherein the inverter comprises DC voltage generating means for generating a DC voltage from the commercial AC voltage supplied from the lamp line; switching means for switching the generated DC voltage and for supplying the high-frequency current to the discharge tube via a resonance circuit including a capacitor connected in parallel with the discharge tube; and driving circuit means for controlling the switching of the switching means based on a signal supplied from external sources, and wherein the communication interface comprises filter means for extracting from the commercial AC voltage an analog signal including lighting control information and superposed on the commercial AC voltage; means for generating a digital control signal sending at least one of switching start information, switching stop information, and switching frequency information to the driving circuit means based on information from the filter means; and lighting control means for sending the digital control signal to the driving circuit means.

Sending a signal from external units to this device for turning on light with a communication function allows the frequency of the AC voltage applied to the discharge tube to be changed, thus making it possible to remotely adjust the brightness of the discharge tube.

The inverter further comprises a first sensor generating lighting state information as a digital lighting state signal and wherein the communication interface converts the digital lighting state signal, received from the first sensor, to an analog signal and superposes the signal on the commercial AC voltage for transmission to external units via the lamp line. In addition, the inverter further comprises a second sensor detecting a presence of and a life running-down state of the discharge tube and wherein the communication interface converts the digital lighting state signal, including information detected by the first sensor and second sensor, to an analog signal, superposes the signal on the commercial AC voltage, and transmits the signal to external units via the lamp line. This makes the management and maintenance of the illumination apparatus more efficient.

The lighting control means further comprises storing means for storing therein a control pattern controlling the discharge tube in such a way that the discharge tube is lighted at a maximum luminous flux for a predetermined time after a start of lighting and, after the predetermined time, at a luminous flux lower than the maximum luminous flux. This allows the user to use the illumination apparatus more efficiently and reduces the power consumption.

DETAILED DESCRIPTION OF THE INVENTION

Figure 2:
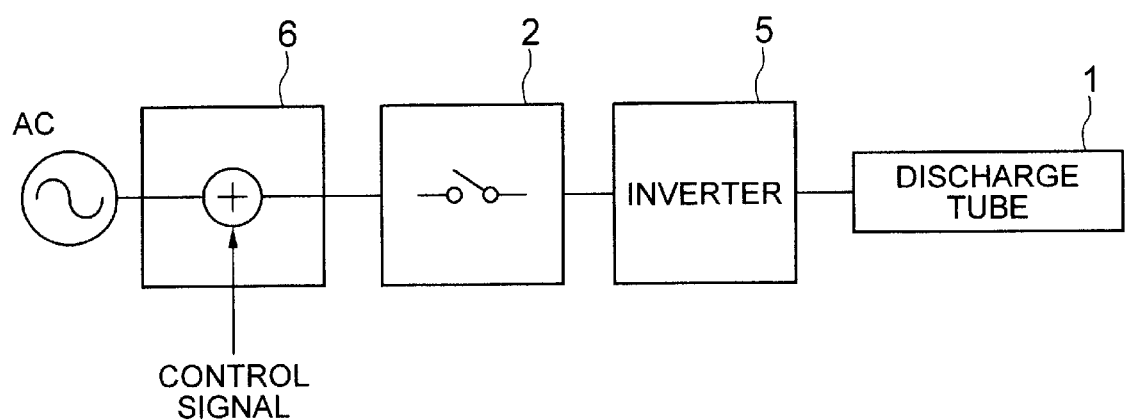
FIG. 2 is a diagram showing the operation of the device for turning on light of the present invention.

FIG. 2 is a block diagram showing the operation of a device for turning on light according to the present invention. A discharge tube 1 may be a standard fluorescent lamp with a filament or an illumination lamp, such as a non-electrode fluorescent lamp, without a filament in which a plasma is generated by the line of magnetic force emitted from an excitation coil. A control unit 6 superposes the control signal for brightness adjustment on the commercial AC power AC. Upon detecting the control signal, switching means 2 sends to an inverter 5 the DC voltage responsive to the control signal or the signal to control the discharge tube 1.

Figure 1:
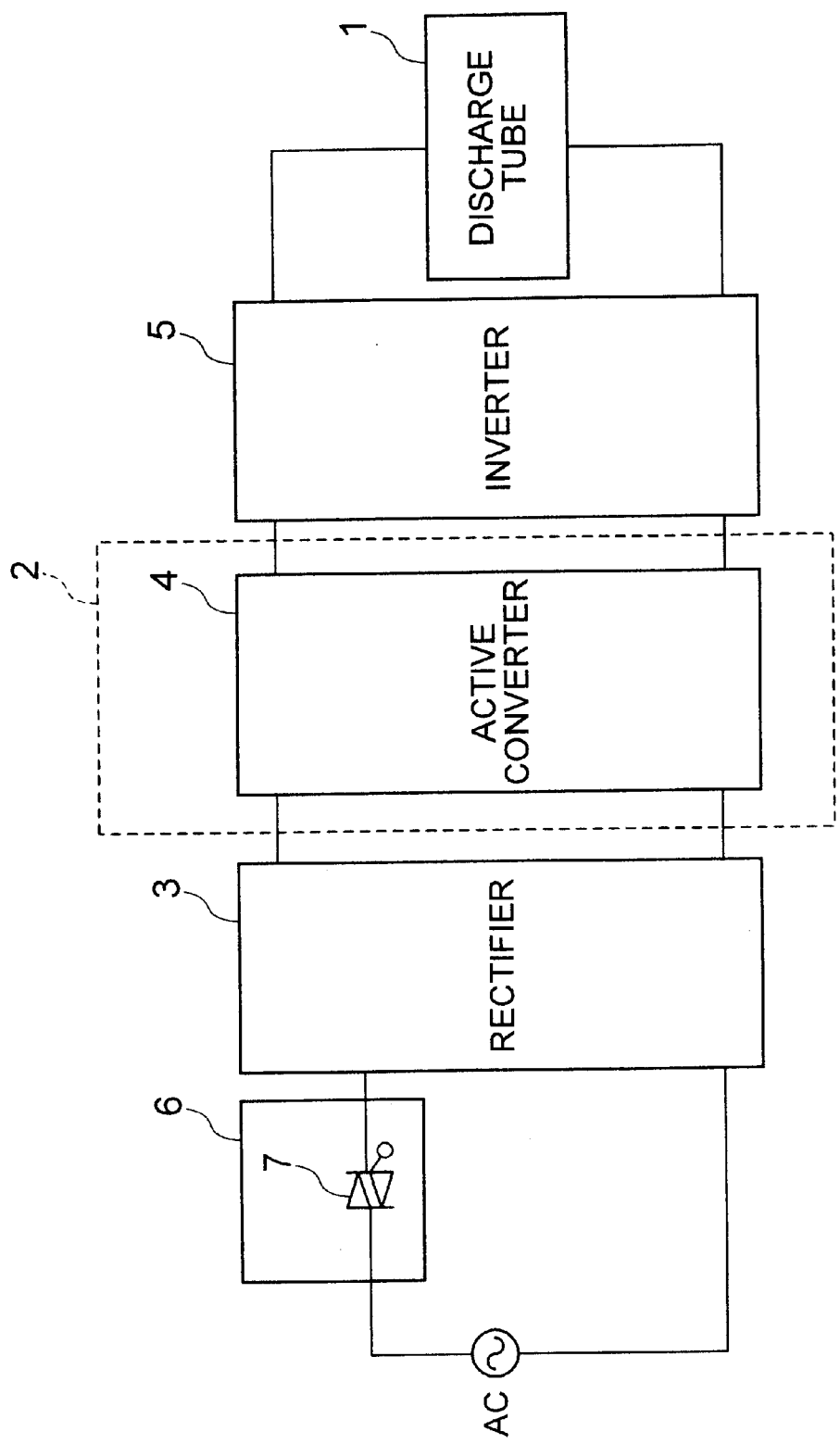
FIG. 1 is a block diagram of a first embodiment of a device for turning on light according to the present invention.
Figure 3:
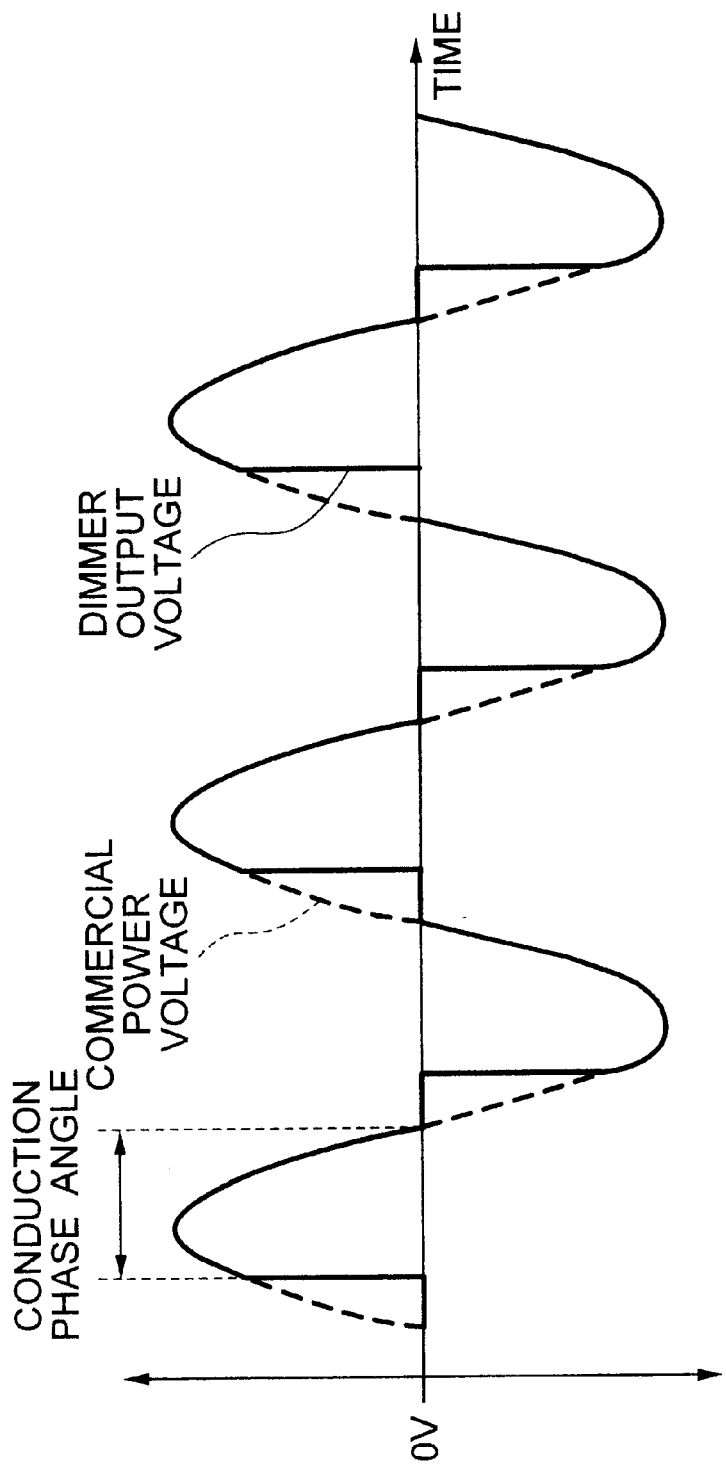
FIG. 3 is a diagram showing the operation of conduction phase angle control of a dimmer.

FIG. 1 is a block diagram showing a first embodiment of the device for turning on light according to the present invention. The commercial AC power AC, phase-angle controlled by a dimmer 7 which is a control unit, outputs the voltage only during the periods corresponding to the conduction phase angle indicated by the arrow in FIG. 3. The waveform indicated by the dotted line is the commercial power voltage input to the dimmer 7. In FIG. 1, the voltage output from the dimmer 7 is rectified by a rectifier 3. The rectified voltage is transformed to a voltage responsive to the conduction phase angle, shown in FIG. 3, by an active converter 4 which acts as switching means. The voltage applied to the inverter 5 is a DC voltage obtained by the converter 4. The inverter 5 transforms this DC voltage to a high-frequency AC voltage and applies it to the discharge tube 1 to turn it on.

Figure 4:
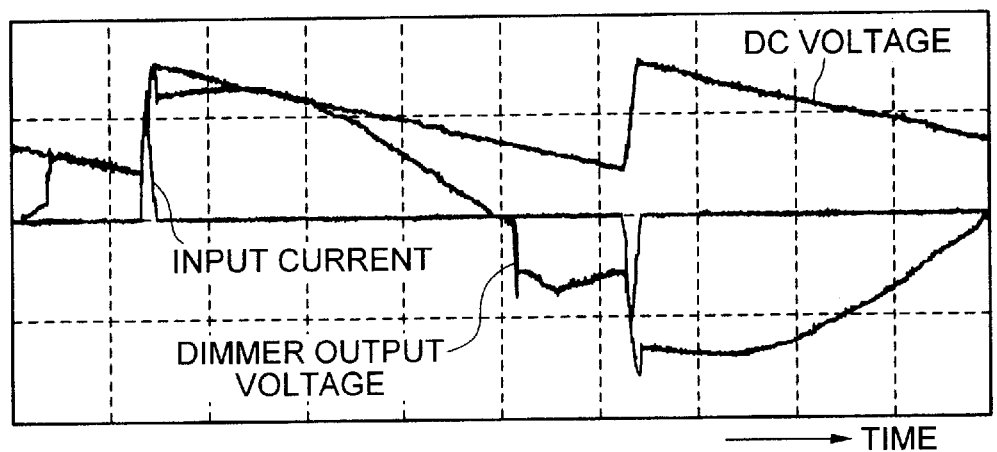
FIG. 4 is a diagram showing the waveforms indicating the relation between the dimmer output voltage of the conventional device for turning on light and the DC voltage supplied to an inverter.

Because the conventional inverter-type circuit for turning on light rectifies the commercial AC power AC with the rectifier 3 to generate the DC voltage with a capacitor which smoothes the pulsating current, it acts as a capacitive impedance to the dimmer 7. Thus, immediately after the triac of the dimmer 7 is turned on, a rush current suddenly flows from the AC power AC, causing the dimmer 7 to malfunction. FIG. 4 shows the waveforms of the output voltage of the dimmer in the conventional device for turning on light, input current from the AC power, and DC voltage. When the DC voltage becomes lower than the output voltage of the dimmer 7, the rush current flows from the AC power. The problem is that, because the dimmer 7 does not operate properly, the output voltage of the dimmer is not phase-angle controlled.

On the other hand, the device for turning on light with the configuration shown in FIG. 1 has the active converter 4 so that the circuit for turning on light does not act as a capacitive impedance to the dimmer 7. This configuration allows the input current with a waveform similar to that of the output voltage of the dimmer 7 to flow. Thus, the configuration implements a resistive load such as that of an incandescent lamp. At the same time, the configuration eliminates the difference in phase between the voltage and the current and increases the power factor.

Figure 5:
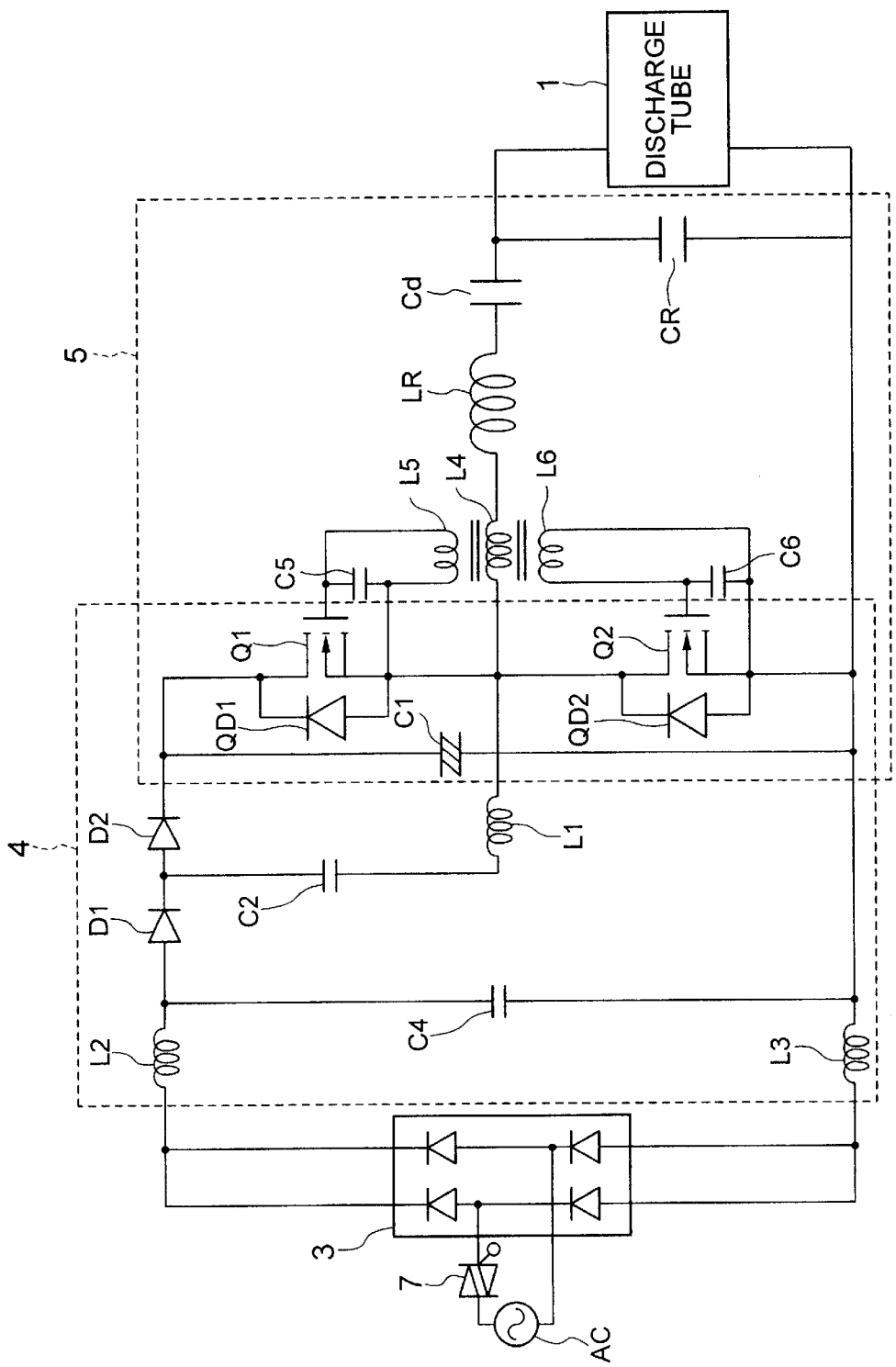
FIG. 5 is a circuit diagram showing the device for turning on light in the first embodiment of the present invention.

FIG. 5 is a circuit diagram showing the first embodiment of the present invention. Referring to FIG. 5, the voltage obtained by rectifying the AC power AC with the rectifier 3, composed of diode bridges, is converted to a DC voltage by the resonance-type active converter 4 via a low-pass filter composed of inductors L2 and L3 and a capacitor C4. The voltage is transformed by the inverter 5 to a high-frequency voltage and is supplied to the discharge tube 1 for high-frequency lighting.

The active converter 4 and the inverter 5 share two non-complementary power semiconductor switching elements Q1 and Q2. The switching elements Q1 and Q2 are each an N-channel power MOSFET which has a drain terminal receiving the electric current, a source terminal sending the electric current, and gate terminal to which the control voltage is applied. Applying or not applying the control voltage to the gate terminal causes the electric current between the drain and the source to flow or to stop, respectively. Each MOSFET, with a diode arranged in parallel from the source terminal to the drain terminal, allows the current to flow bi-directionally. In the description below, the diode contained in Q1 is called QD1, and the diode contained in Q2 is called QD2.

In the active converter 4, diodes D1 and D2 are connected in series in a forward direction between the contact between inductor L2 and the capacitor C4 of the low-pass filter and the high-potential side of a smoothing capacitor C1. In addition, a resonance circuit composed of a capacitor C2 and an inductor L1 connected in series is inserted between the contact between D1 and D2 and the contact between Q1 and Q2 connected in the half-bridge structure.

The inverter 5 has the switching elements Q1 and Q2 between the positive electrode and the negative electrode of the DC power. Between the drain and the source of Q2, a series resonance circuit, which is composed of inductors L4 and LR and resonance capacitor CR connected in series, is connected. The discharge tube 1 is connected in parallel with the capacitor CR. Inductors L5 and L6 are feedback windings for the inductor L4. The inductor L5, provided in parallel with capacitor C5, is connected between the gate and source of the switching element Q1, while the inductor L6, provided in parallel with capacitor C6, is connected between the gate and source of the switching element Q2.

The switching elements Q1 and Q2 feed back the high-frequency current flowing through the inductor L4 with the use of the inductors L5 and L6 for self-oscillation. The inductor L4 may also be shared as a resonance inductor. The switching frequency of the inverter is set higher than the resonance frequency determined by the resonance inductor LR and the resonance capacitor CR of the inverter 5. That is, the switching frequency is set higher than the resonance frequency so that the phase of the resonance current lags behind that of the output voltage of the inverter.

As the switching frequency approaches the resonance point, the impedance of the resonance circuit decreases to give a high voltage required to allow the discharge tube to keep on lighting. However, the self-oscillation inverter like this cannot change the switching frequency freely. Therefore, in this embodiment, the amplitude of the DC voltage supplied to the inverter is changed to control the power of the discharge tube and to change the brightness of the discharge tube. For example, as the DC voltage decreases, the resonance current decreases and therefore the current flowing through the discharge tube decreases. Because the discharge tube has negative resistance characteristics, the equivalent resistance of the discharge tube increases as the current decreases. Because the discharge tube is connected in parallel with the resonance capacitor, the resonance frequency increases as the resistance of the discharge tube increases. Therefore, the switching frequency of the self-oscillation inverter is automatically increased. This decreases the impedance of the resonance capacitor, increases the equivalent resistance of the discharge tube, changes the ratio between the currents flowing through them, and changes the power of the discharge tube. That is, changing the DC voltage of the inverter automatically changes the switching frequency, making it possible to control the power of the discharge tube. Next, the active converter which controls the DC voltage according to the conduction phase angle of the dimmer will be described.

Figure 6:
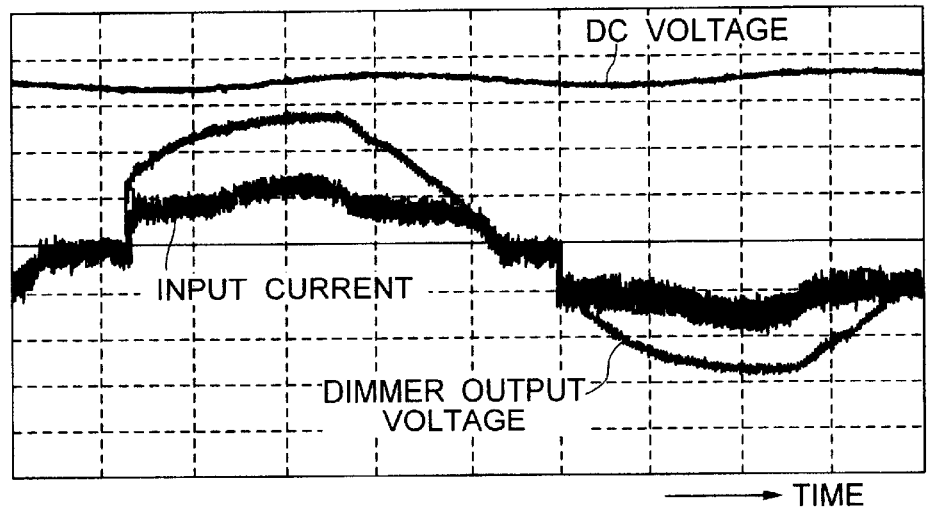
FIG. 6 is a waveform diagram showing the voltage and the current of the circuit shown in FIG. 5.

Alternately turning on and off the switching elements Q1 and Q2 at a high frequency causes the current to flow from the AC power AC into the inductor L1 and the capacitor C2 of the active converter 4, changes the voltage of the connection point between diodes D1 and D2, and charges the smoothing capacitor C1. Therefore, because the input current flows according to the voltage of the commercial AC power, sending the high-frequency current, which flows in response to the switching, to the low-pass filter makes the waveform of the input current similar to that of the output voltage of the dimmer 7, as shown in FIG. 6. The DC voltage applied to the inverter depends on the composite impedance of the inductor L1 and the capacitor C2 of the active converter 4. Therefore, decreasing the impedance allows the DC voltage to become higher than the output voltage of the dimmer as shown in FIG. 6.

Figure 7:
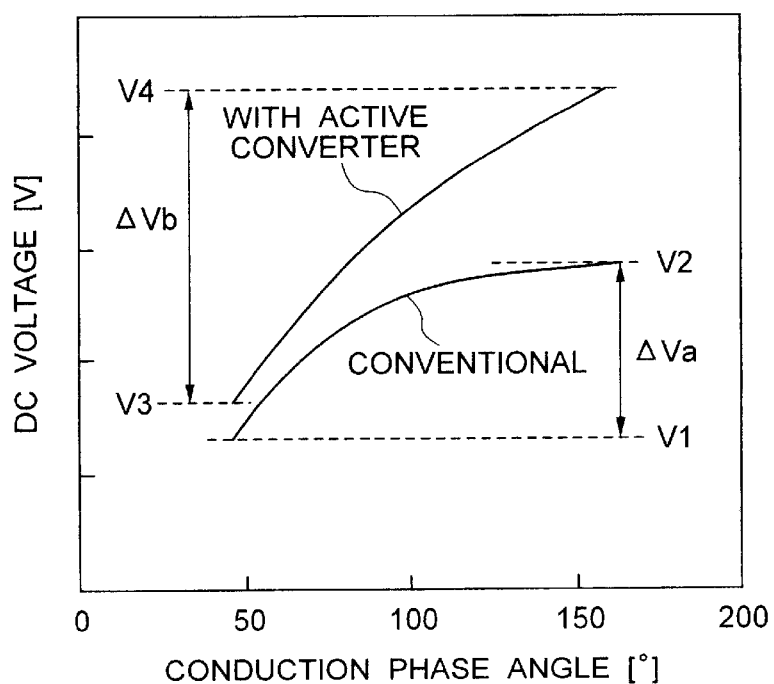
FIG. 7 is a graph showing the relation between the conduction phase angle of a dimmer and the DC voltage supplied to the inverter when an active converter is used and when the active converter is not used.

In addition, the resonance frequency, which is determined by the inductor L1 and the capacitor C2, is set lower than the switching frequency of the inverter so that the phase of the resonance current flowing through the active converter lags behind the phase of the output voltage of the inverter. The current charged in the capacitor C1 changes according to the conduction phase angle of the AC power voltage when it is controlled by the dimmer 7. Therefore, the DC voltage also changes, and the relation between the conduction phase angle and the DC voltage is as shown in FIG. 7.

The following describes the difference in the change in the DC voltage between the conventional converter and the active converter used in this embodiment. For example, when the conduction phase angle changes from 50° to 150°, the DC voltage of the conventional converter changes from V1 to V2 by ΔVa although the dimmer malfunctions. On the other hand, the DC voltage of the active converter changes from V3 to V4 by αVb. The DC voltages V3 and V4 are higher than V1 and V2, respectively, and the voltage change ΔVb is higher than ΔVa. The use of the active converter prevents the malfunction of the dimmer and, in addition, makes the DC voltage higher than the commercial AC power voltage. In this embodiment, largely changing the change in the amplitude of the DC voltage supplied to the inverter 5 largely changes the output power of the discharge tube. This enables the brightness of the discharge tube to be largely changed according to the conduction phase angle of the AC.

Figure 8:
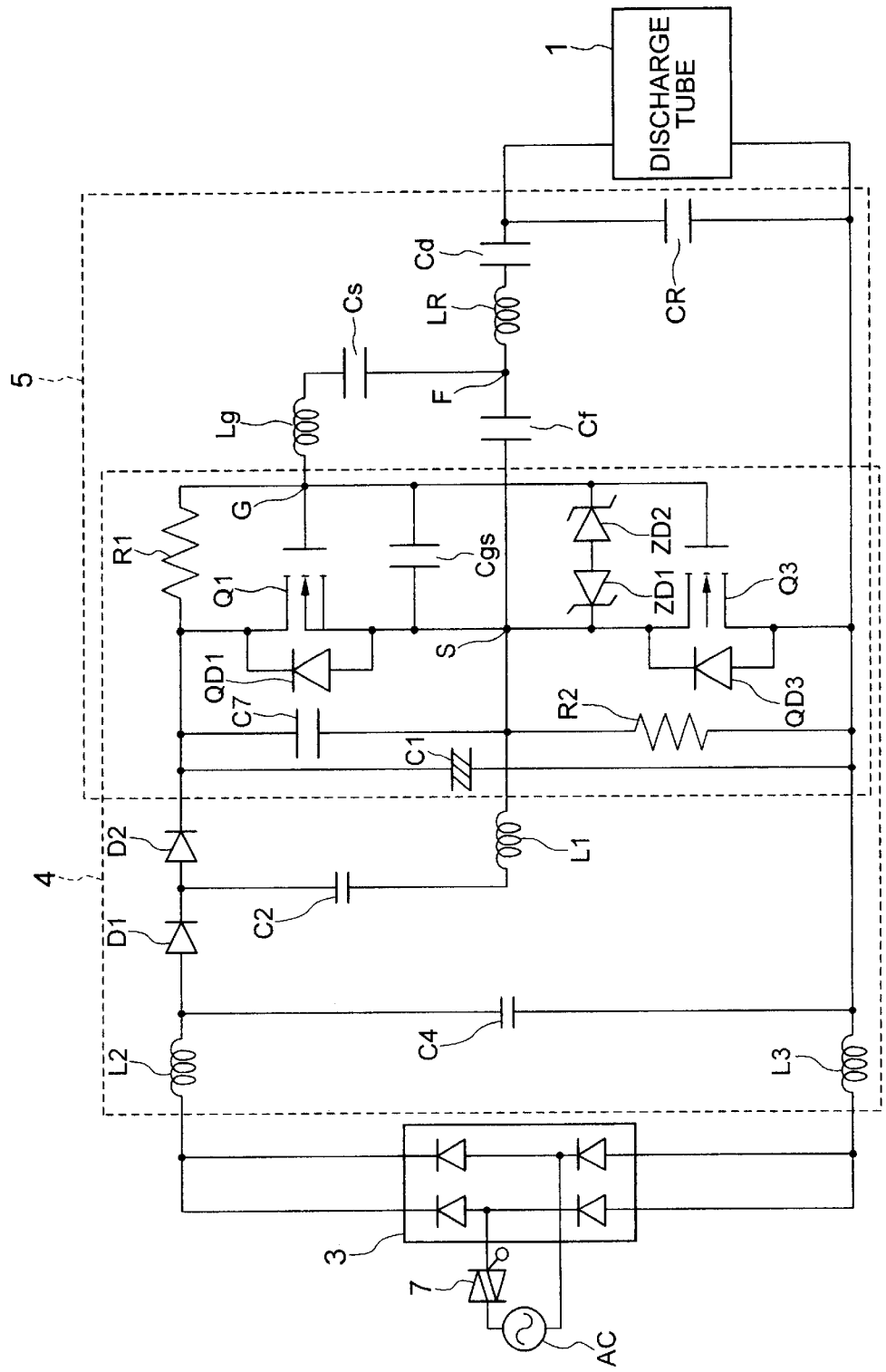
FIG. 8 is a circuit diagram showing a device for turning on light in a second embodiment of the present invention.

FIG. 8 is a circuit diagram of a second embodiment of a device for turning on light according to the present invention. Referring to FIG. 8, like reference numbers designate like components in FIG. 5, and their description is omitted. In the second embodiment, an active converter 4 and an inverter 5 share two complementary power semiconductor switching elements Q1 and Q3. Unlike those in the first embodiment, the switching element Q1 is an N-channel power MOSFET, and switching element Q3 is a P-channel power MOSFET. They are complementary. A feedback diode (hereafter called QD1) is contained between the source terminal and the drain terminal of Q1. A feedback diode (hereafter called QD3) is contained between the drain terminal and the source terminal of Q3. The source terminals of the switches Q1 and Q3 are connected by the common connection point S. The gate terminals are connected by the connection point G. The current flowing between the drain and the source of Q1 and Q3 is controlled by the same voltage between the connection point G and the connection point S.

Between the connection point S and the negative electrode of a capacitor C1, a capacitor Cf and a resonance load circuit including a resonance inductor LR, resonance capacitor CR, and DC component removing capacitor Cd are connected. A discharge tube 1 is inserted in parallel with the CR. The capacitor Cd of the resonance load circuit need not be included. In addition, the resonance load circuit may be connected between the connection point S and the positive electrode of the capacitor C1. The frequency of the current flowing through these resonance load circuits depends on the values of the elements.

Alternately turning on and off the switching elements Q1 and Q3 causes the current to flow bi-directionally in the resonance load circuit, and the discharge tube to turn on. A capacitor C7 connected between the drain and the source of the switch Q1 adjusts the change in the voltage across the drain and the source of both switches. T capacitor C7, if connected between the drain and the source of Q3, may perform the same function.

The gate driving circuit controlling the conduction state of the switches Q1 and Q3 includes the capacitor Cf connected to the resonance load circuit. The capacitor Cf gets the driving voltage from the current flowing through the resonance load circuit to cause the gate driving circuit to operate. With one end of the capacitor Cf as the point F, an inductor Lg and a capacitor Cs are connected between the connection points G and F. The inductor Lg generates a phase difference in the voltage across the gate and the source for the current flowing through the resonance load circuit. The capacitor Cs removes the DC component superposed on the AC voltage applied between the gate and the source.

Zener diodes ZD1 and ZD2, opposed each other and connected in series, are provided in parallel between the gate and the source. These diodes prevent the elements from being destroyed when an over-voltage is applied across the gate and the source of the switching elements Q1 and Q3. In addition, a capacitor Cgs is connected between the gate and the source to adjust the change in the voltage across the gate and the source. That is, when alternately turning on and off the switches Q1 and Q3, this capacitor compensates for the dead time from the moment one switch is turned off to the moment the other switch is turned on. The current flowing through the switches Q1 and Q3 is the composite of the current flowing through the resonance load circuit and the current flowing through the active converter. Because the current flowing through the active converter changes in response to the voltage of the commercial AC power, the current of the switches Q1 and Q3 also changes. This affects the amount of the current that is cut off when the gate voltage of the switches Q1 and Q3 falls below the threshold and the switches are turned off. Because this current charges or discharges the parasitic capacitance of the switches Q1 and Q3 and the capacitor C7 after the switches are turned off, the time at which the voltage across the drain and the source of the switches changes to the positive potential or negative potential of the DC power voltage varies. When the gate voltage exceeds the threshold of the switches and the switches are turned on while the voltage across the drain and the source changes, a through current flows along the path including the capacitor C7 and switch Q1 or Q3, generating heat in the switch. In this embodiment, the driving circuit composed of the capacitors Cf and Cgs and inductor Lg gives an appropriate phase difference to the gate voltage of the switch to control the time at which the switches are turned on. This phase difference, given according to the change in the load resonance frequency or the amount of the current flowing through the switch, prevents the through current.

In FIG. 8, as the voltage of the AC power AC increases during startup and the DC voltage of the capacitor C1 increases, the current flows along the path composed of a resistor R1 connected between the drain and the gate of Q1, the inductor Lg, the capacitors Cs and Cf, and a resistor R2 connected between the source and the drain of Q3. This current gradually increases the voltage at the connection point G, that is, the voltage between the gate and the source. As the voltage across the gate and the source exceeds the threshold voltage of the switching element Q1, Q1 is turned on. Then, the current flows from the connection point S to the connection point F, thus decreasing the voltage at the connection F. This makes the voltage across the gate and the source immediately fall below the threshold voltage of Q1, turning off Q1. At this time, because the capacitor Cf connected between the connection points F and S, the capacitor Cgs, and the inductor Lg form the LC resonance circuit, a slight change in the voltage of the capacitor Cf increases the current flowing through the LC resonance circuit and, therefore, increases the amplitude of the voltage across the gate and the source. This oscillation starts the switching operation in which the switches Q1 and Q3 are turned on and off alternately. As in the first embodiment described above, alternately turning on and off the switching elements Q1 and Q3 at a high frequency causes the current to flow from the alternate current power AC into the active converter 4. This current charges the capacitor C1 according to the output of the dimmer 7 and controls the DC voltage.

Figure 9:
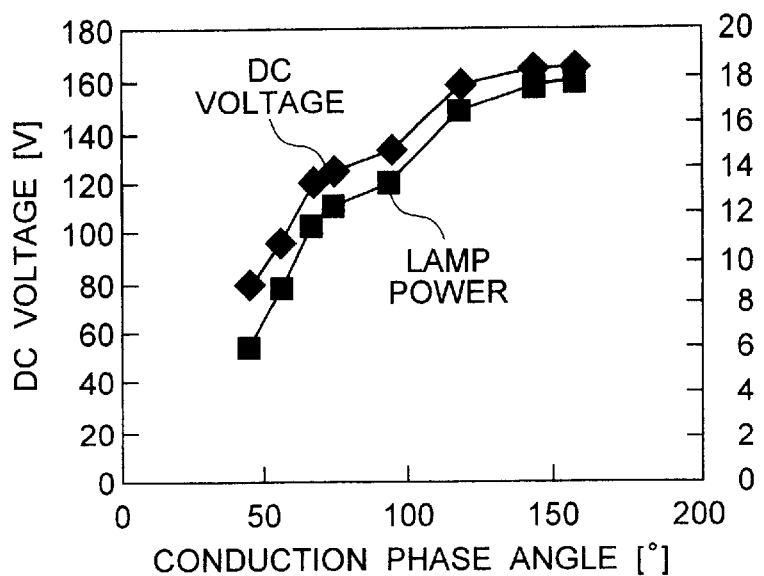
FIG. 9 is a graph showing the relation between the conduction phase angle of the dimmer, the DC voltage supplied to the inverter, and the lamp power of the device for turning on light shown in FIG. 8.
Figure 10:
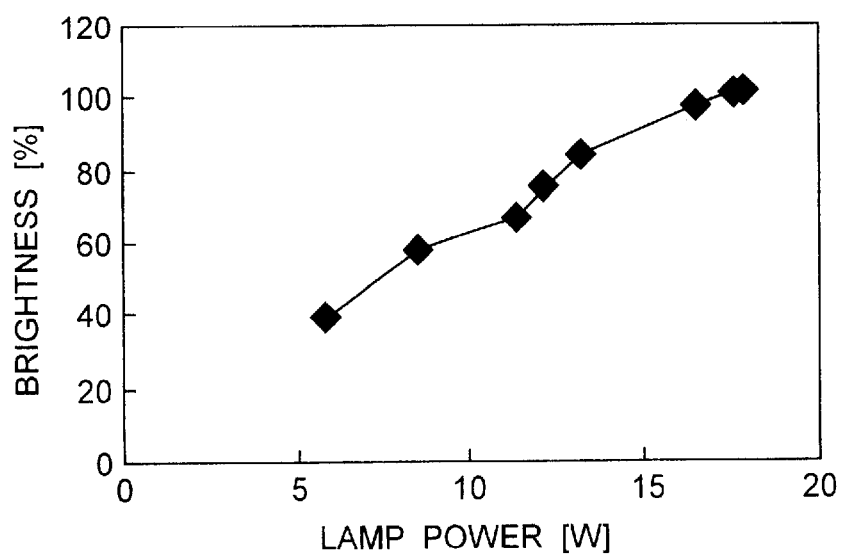
FIG. 10 is a graph showing the relation between the lamp power and the brightness of the lamp of the device for turning on light shown in FIG. 8.

FIG. 9 shows the relation between the DC current and the lamp power with respect to the AC conduction phase angle in the embodiment shown in FIG. 8. Referring to FIG. 9, the DC voltage gradually decreases as the conduction phase angle decreases and, as the voltage decreases, the lamp power decreases. The relation between the lamp power and the brightness of the lamp is shown in FIG. 10. As the lamp power decreases from 18W to 6W, 100% of the brightness at 18W decreases to 40% at 6W. In the second embodiment, the conduction angle of the commercial AC power is controlled by the dimmer described above. Even when the conduction phase angle control signal is superposed on the lamp line, it is possible to adjust the output power of the discharge tube according to the phase angle control signal.

Figure 11:
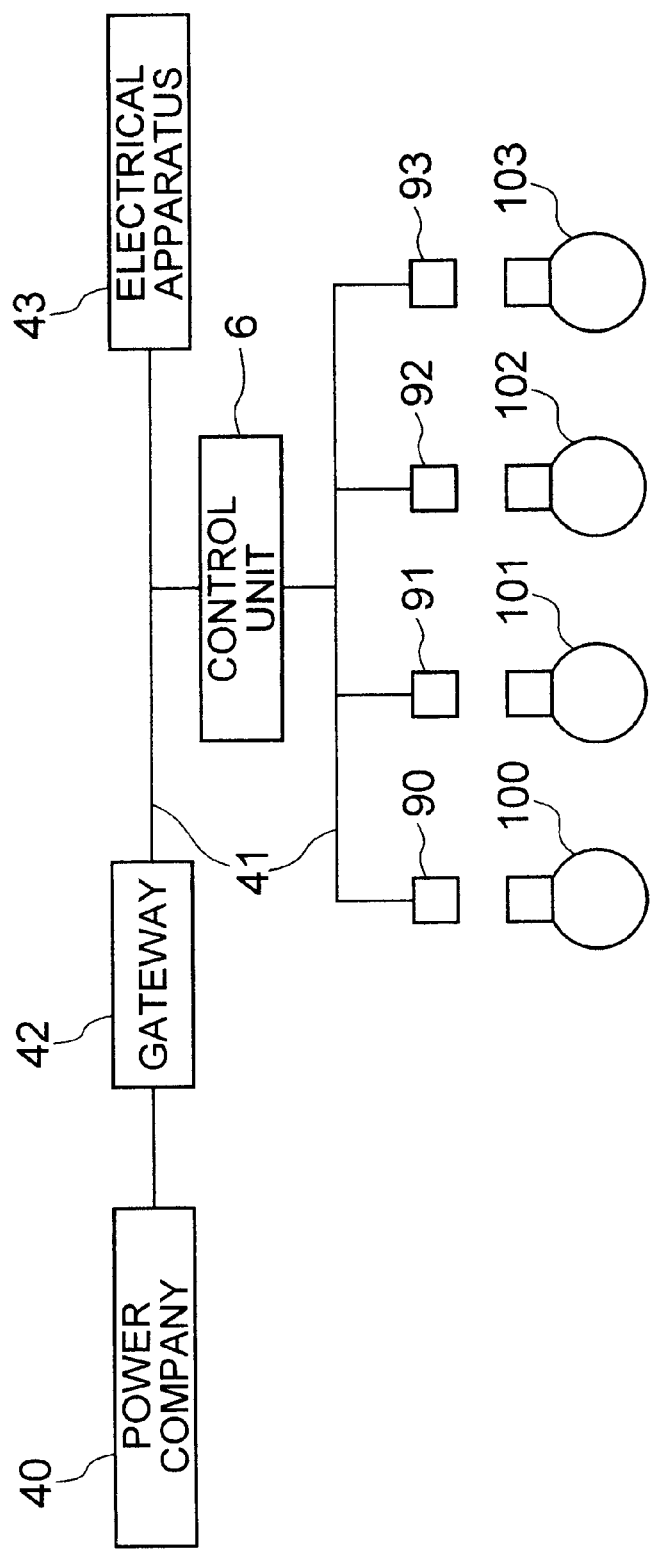
FIG. 11 is a configuration diagram showing an illumination system using an illumination apparatus according to the present invention.
Figure 12:
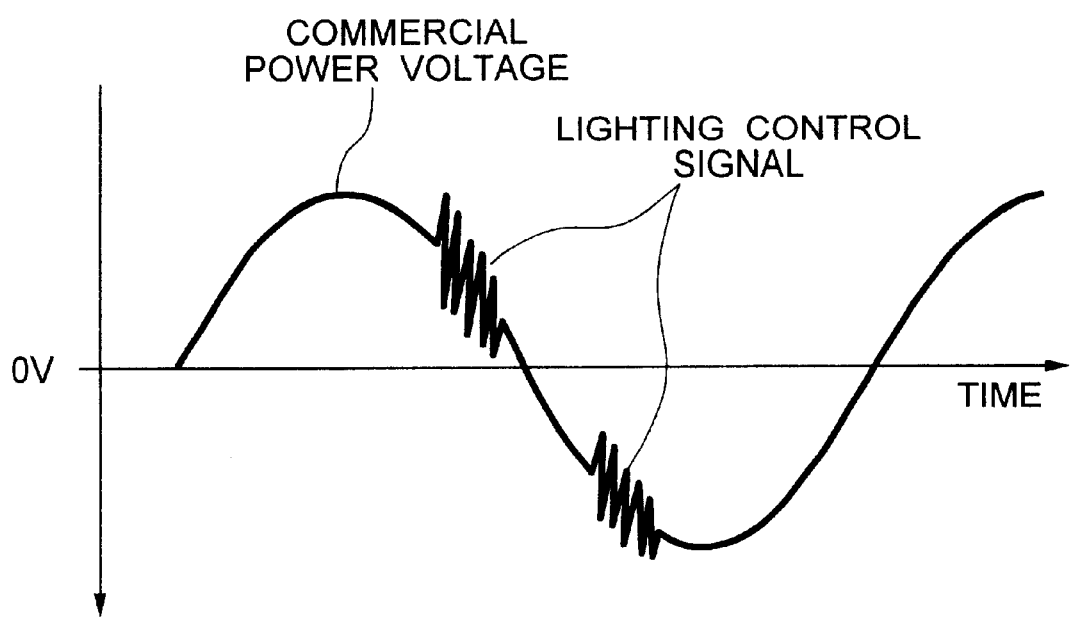
FIG. 12 is a waveform diagram showing a lighting control signal superposed on the commercial AC voltage.

FIG. 11 is a configuration diagram of an illumination system configured by the illumination apparatus of the present invention. This figure shows an illumination system which superposes the lighting control signal on the commercial AC voltage supplied by a power company 40 via a lamp line 41, as shown in FIG. 12, to control a plurality of devices for turning on light 100–103 connected to the lamp line. In FIG. 11, a gateway 42 connected to the lamp line between the power company and the power user functions as an interface via which the power company monitors the amount of power used by power users and controls the amount of power. The control unit 6 connected in series to the lamp line between the gateway 42 and connection units 90–93 functions as a central terminal controlling the devices for turning on light. The devices for turning on light 100–103 are connected to the connection units 90–93.

The connection units 90–93 each have a unit in which the connection unit installation position is stored. This position information allows the control unit 6 to identify the location of each connection unit. Superposing this position information on the control signal allows the devices for turning on light to be controlled individually. Upon detecting that a device for turning on light is connected, each connection unit sends the signal to the control unit 6. This signal enables the control unit to determine if a device for turning on light is connected.

An electrical apparatus 43 for adjusting the brightness of the illumination apparatus is connected to the lamp line 41. This electrical apparatus 43 is able to transfer information to or from the devices for turning on light 100–103 via the control unit 6. A device for turning on light with a communication function to communicate via the lamp line 41 in such a system described above will be described below.

Figure 13:
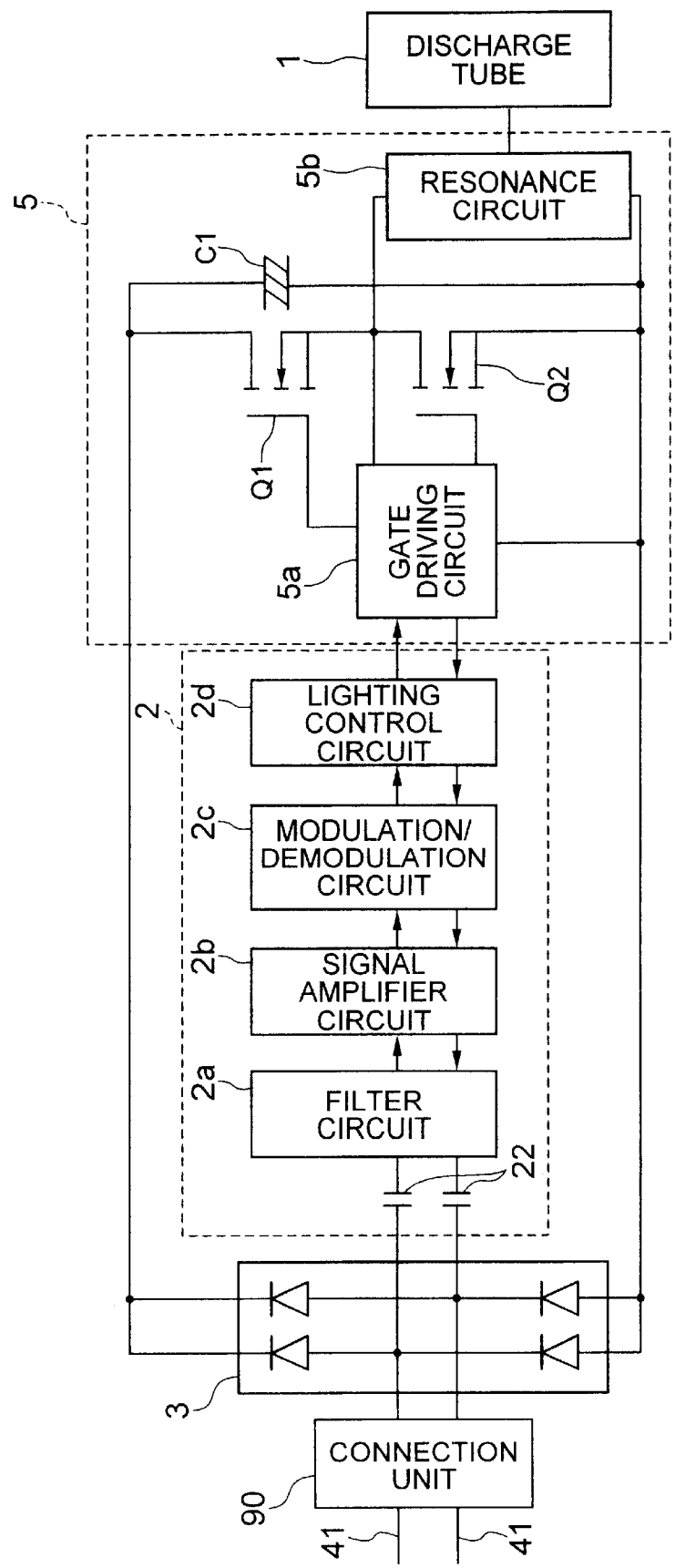
FIG. 13 is a circuit diagram showing a first embodiment of the device for turning on light with a communication function according to the present invention.

FIG. 13 shows a first embodiment of a device for turning on light with the communication function which may be used in the illumination system described above. An inverter 5 comprises two non-complementary power semiconductor switching elements Q1 and Q2, a resonance circuit 5b, and a gate driving circuit 5a which controls the conduction state of the switches. The device for turning on light in this embodiment has a communication interface 2 which comprises coupling capacitors 22, a filter circuit 2a, a signal amplifier circuit 2b, a modulation/demodulation circuit 2c, and a lighting control circuit 2d. This interface sends and receives the control signal to or from the control unit 6.

Figure 14:
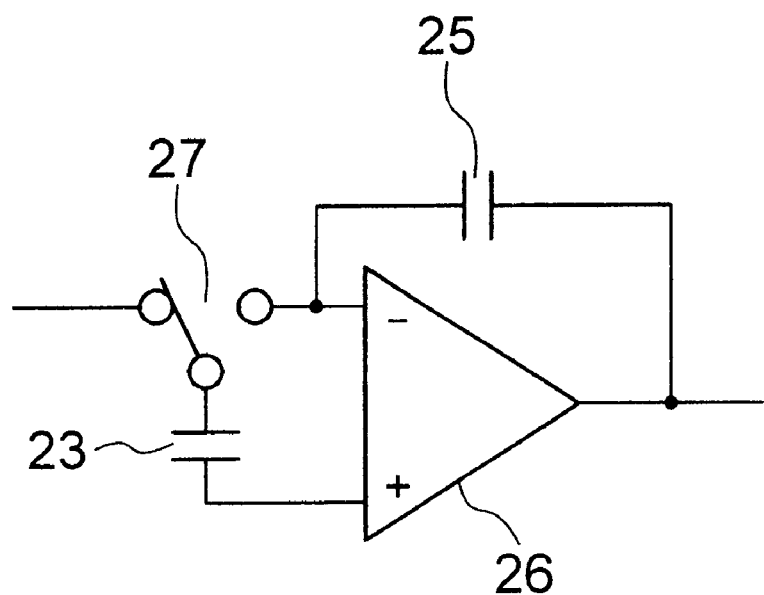
FIG. 14 is a circuit diagram of a filter circuit used in the device for turning on light shown in FIG. 13.

The coupling capacitors 22 electrically separate the lamp line and the communication interface. The coupling capacitors 22 may be replaced with coupling transformers. The filter circuit 2a included in the communication interface 2 is a band through filter which passes only the signal in the frequency band used by lamp line communication and removes the signal outside the band. As shown in FIG. 14, this filter may be monolithic, for example, when combined with a switched capacitor filter comprising capacitors 23 and 25, a switch 27, and an ope-amplifier 26.

The signal amplifier circuit 2b amplifies the signal to ensure that the information intelligent when the signal attenuates while propagating through a long line between the control unit 6 and the device for turning on light. The circuit also amplifies the signal when the signal is superposed on the Ac voltage sent from the device for turning on light to the lamp line. The modulation/demodulation circuit 2c demodulates the analog signal sent from the lamp line via the filter circuit 2a and signal amplifier circuit 2b, or modulates the digital signal and outputs the analog signal. The lighting control circuit 2d decodes the digital signal output from the modulation/demodulation circuit 2c. For example, upon receiving a command that darkens the discharge tube to 80%, the circuit outputs the control signal to increase the switching frequency of the inverter. When the signal indicating the state of the inverter is sent from the gate driving circuit 5a, the lighting control circuit decodes the signal and outputs the digital signal to the modulation/demodulation circuit 2c.

The gate driving circuit 5a sends the driving signal to the inverter to drive the high-side and low-side switching elements Q1 and Q2. This driving circuit has a level-shift circuit that converts the driving signal which uses the low-side element as the reference potential to the driving signal which uses the high-side element as the reference potential. In addition, the gate driving circuit 5a contains an oscillator which controls the switching frequency of the inverter based on the control signal from the lighting control circuit 2d. At the same time, the gate driving circuit sends switching frequency information to the lighting control circuit 2d to inform it whether the inverter is turned on.

Figure 15:
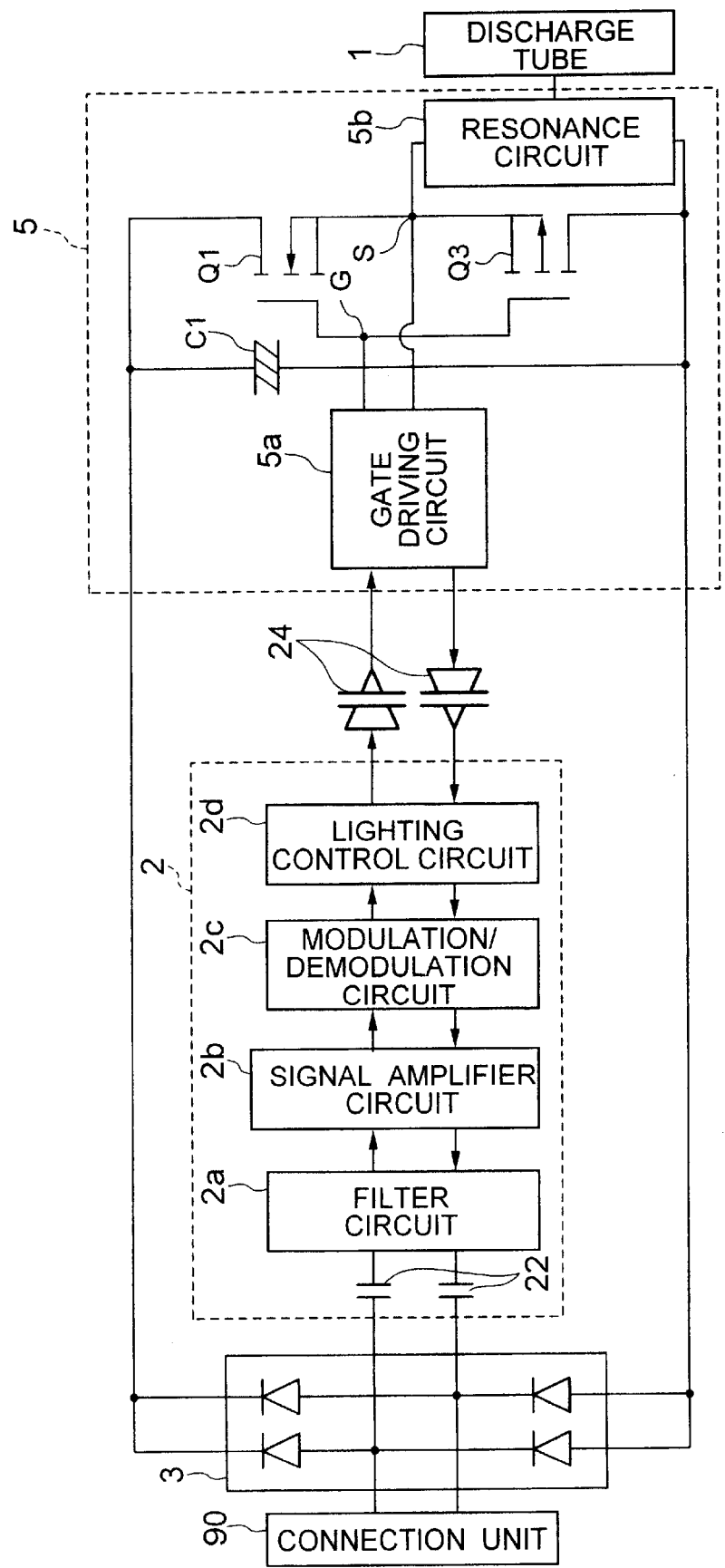
FIG. 15 is a circuit diagram showing a second embodiment of the device for turning on light with the communication function according to the present invention.

FIG. 15 shows a second embodiment of a device for turning on light with the communication function according to the present invention. In this embodiment, the inverter comprises complementary switches connected between DC power sources with the reference potential of the switch control signal different from that of the DC power source. The reference potential of the gate driving circuit of such complementary switches constantly varies. To send the signal to the driving circuit, the signal sending side and the signal receiving side must be electrically separated.

The device for turning on light in this embodiment comprises coupling capacitors 22 such as those shown in FIG. 13 and a communication interface 2 comprising a filter circuit 2a, signal amplifier circuit 2b, modulation/demodulation circuit 2c, and lighting control circuit 2d. Between the inverter controller including a gate driving circuit 5a and the communication interface 2 are provided isolators 24 that electrically separate signals for transfer between the inverter controller and communication interface. The communication interface 2 is the same as the one described in FIG. 13 and therefore its description is omitted.

Figure 16:
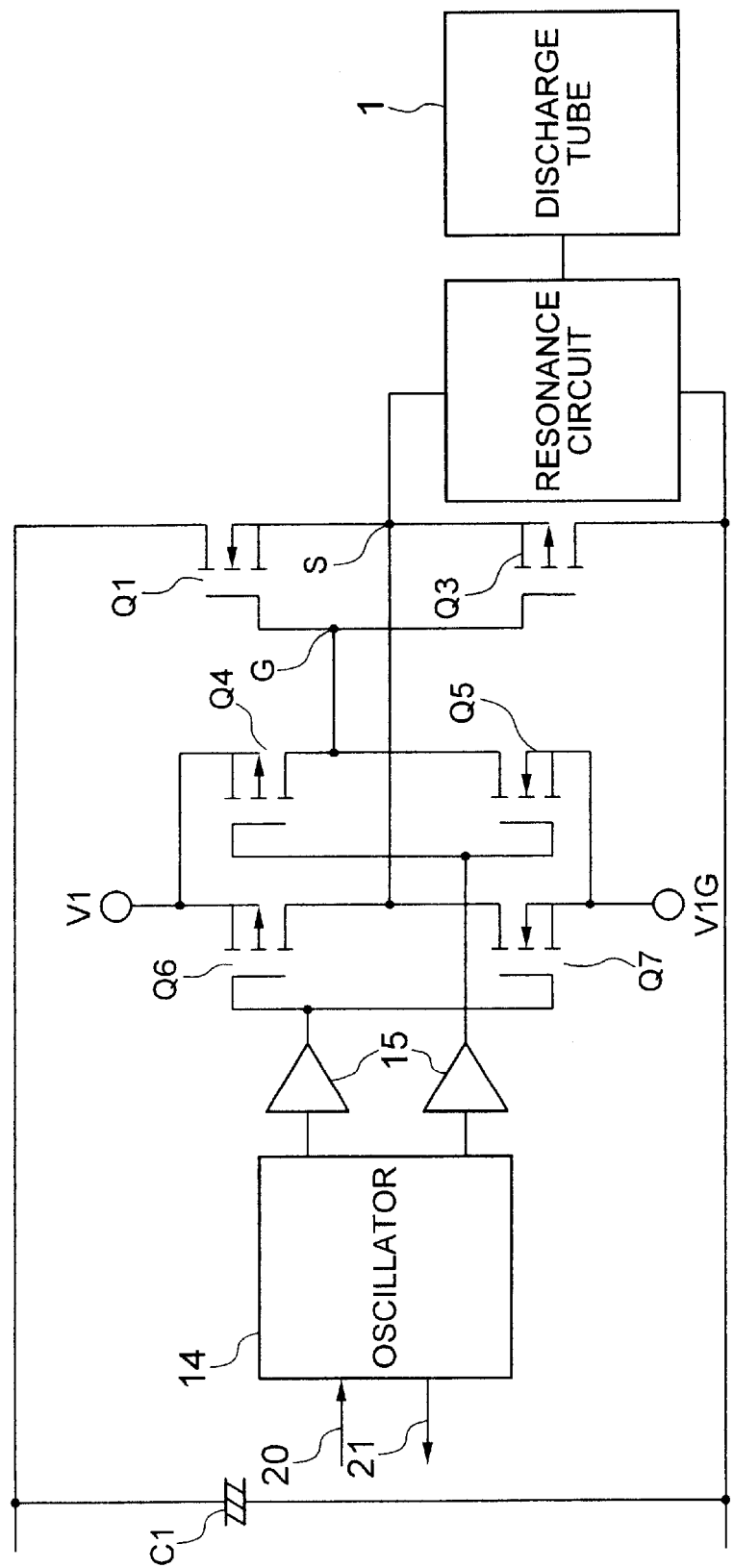
FIG. 16 is a circuit diagram showing the details of a gate driving circuit of the device for turning on light shown in FIG. 15.

FIG. 16 shows the circuit configuration of the gate driving circuit 5a which drives complementary switches Q1 and Q3. To the control node point G of the complementary switches Q1 and Q3 connected between the positive potential and the negative potential of the smoothing capacitor C1, the output node of the CMOS transistor, composed of the p-channel transistor Q4 and the N-channel transistor Q5 connected together via their drains, is connected. Similarly, to the reference node S, the output node of the CMOS transistor, composed of the P-channel transistor Q6 and the N-channel transistor Q7 connected together via their drains, is connected. The DC voltage is supplied from the nodes V1 and V1G to the CMOS transistors. The gate driving signal is sent to the control input of each CMOS transistor from an oscillator 14 via a buffer 15. The conduction state of the switching elements is controlled by this signal. The oscillator 14 receives a control signal 20 from the lighting control circuit 2d via the isolators 24 and generates a desired frequency to control the switching frequency. At the same time, the oscillator outputs a state signal 21 indicating the state of the inverter.

When a plurality of devices for turning on light must be controlled speedily by the control unit 6 in FIG. 15, the signal must also be transmitted speedily between the communication interface and the inverter controller. The performance of the isolators 24 affects the responsiveness of the devices for turning on light.

Figure 17:
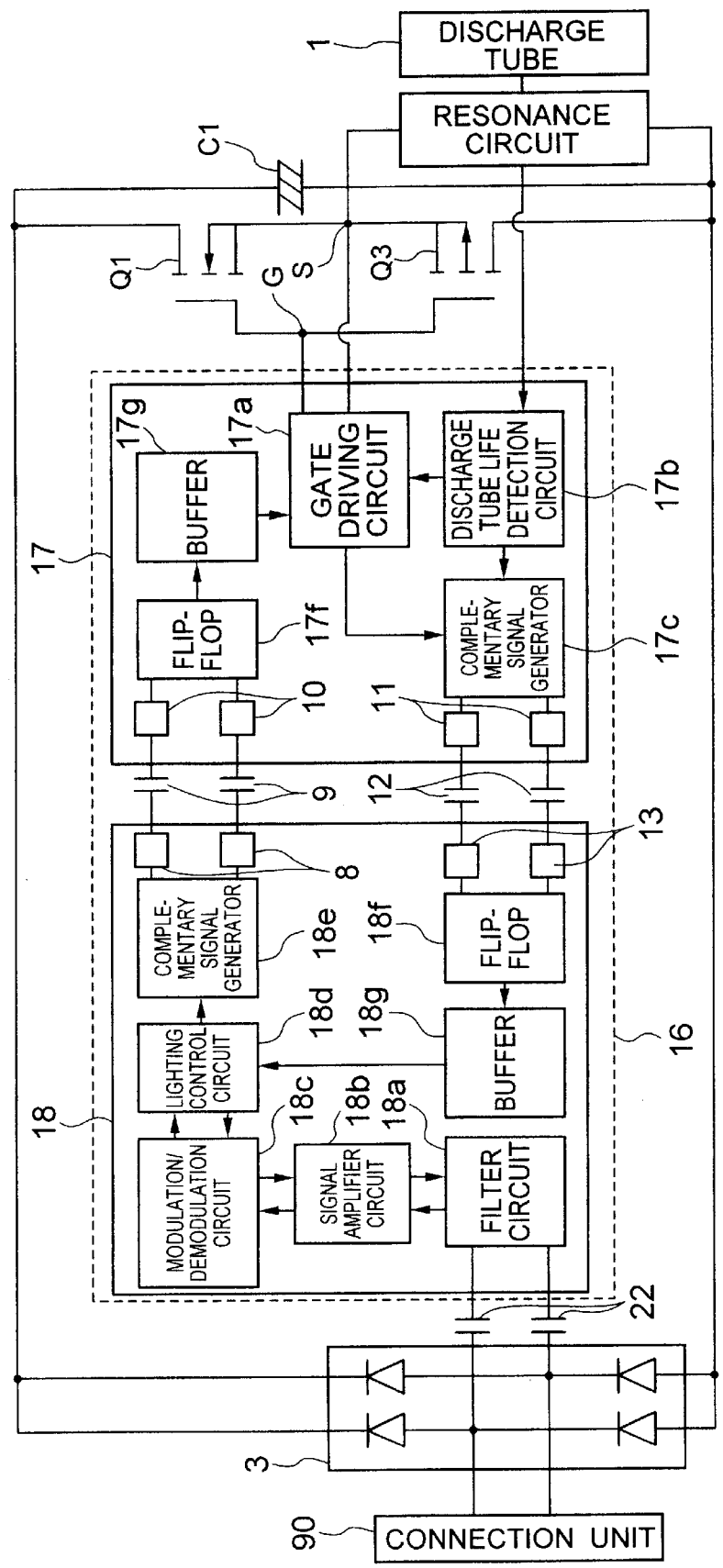
FIG. 17 is a circuit diagram showing a third embodiment of the device for turning on light with the communication function according to the present invention.

FIG. 17 shows a third embodiment of a device for turning on light with the communication function which has isolators satisfying this request. In this embodiment, a control circuit 18 with a communication interface function similar to that in the embodiment described in FIG. 15 and a drive circuit 17 with the inverter control function are provided.

A complementary signal generator 18e in the control circuit 18 receives the digital signal from a lighting control circuit 18d. A complementary signal generator 17c in the drive circuit 17 receives the digital signal from a gate driving circuit 17a. These two signal generators generate signals 180° out of phase. The signals are input to coupling capacitors 9 and 12 by driving circuits 8 and 11, and the complementary signals become differential waveform signals. Sensor circuits 10 in the drive circuit 17 and sensor circuits 13 in the control circuit 18 each detect the differential waveform and output the timing information on the rise and the fall of the pulse. A flip-flop 17f in the drive circuit 17 and a flip-flop 18f in the control circuit 18 reproduce, respectively, the digital signals entered from the lighting control circuit and the gate driving circuit based on the timing information from the sensor circuits 10 and 13. The reproduced digital signals are input to the gate driving circuit 17a and the lighting control circuit via buffers 17g and 18g.

The coupling capacitors 9 and 12 transmit signals bi-directionally while electrically separating the communication interface and the inverter controller. The capacitor-implemented isolators like this, with the peripheral circuit configured by logical circuits, create a slight delay and therefore performs high-speed operation.

The gate driving circuit 17a driving the complementary switches Q1 and Q3 is the same as that shown in FIG. 16. When the drive circuit 17 has a discharge tube life detection circuit 17b which detects the presence and the life of the discharge tube, the gate driving circuit 17a stops the oscillator upon detection of the life running-down signal from the discharge tube life detection circuit 17b, thus preventing the inverter from being damaged.

The conventional non-complementary switches, which require two 180° out-of-phase control signals to drive the inverter, require a level-shift circuit. Thus, the driving circuit is a high-voltage circuit. On the other hand, the gate driving circuit of the complementary switches used in the embodiment described above is simple; that is, it comprises a CMOS transistor, oscillator, and buffer. This simple configuration allows the inverter to be controlled only by one control signal. Therefore, the driving circuit, which is now a low-voltage circuit, may be built into an IC. In addition, the capacitor-implemented isolators, which may be composed of logical circuits as described above, as well as the communication interface may be mounted on the same wafer. Therefore, the part enclosed by a dotted line 16 shown in FIG. 17 may be implemented as a one-chip IC.

Next, with reference to FIG. 18, the power circuit supplying power to the drive circuit 17 and the control circuit 18 will be described.

Figure 18:
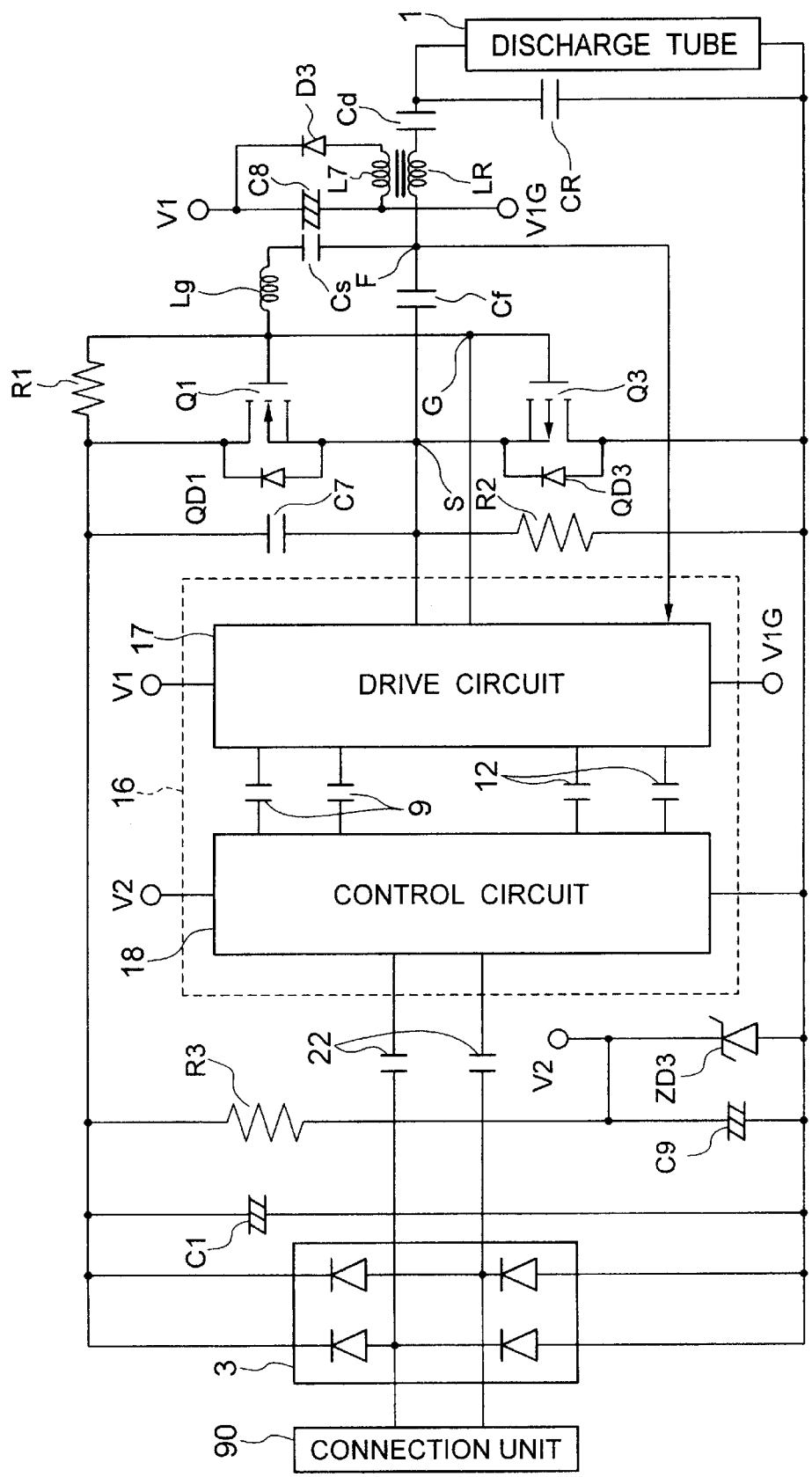
FIG. 18 is a diagram showing a power circuit of the device for turning on light shown in FIG. 17.

In FIG. 18, the reference potential of the gate driving circuit included in the drive circuit 17 is different from the voltage of the capacitor C1, that is, the potential of the DC power. In the circuit shown in the figure, with a secondary winding L7 provided in the resonance inductor LR, the voltage of the secondary winding generated by the resonance current flowing through the inductor LR is used. This voltage causes the charge current to flow into a capacitor C8 via a diode D3. The voltage across C8, which is a DC voltage different from the voltage across C1, is supplied to the node points V1 and V1G of the drive circuit 17. On the other hand, the reference potential of the control circuit 18, which is the same as that of C1, is obtained by connecting a resistor R3 and a capacitor C9 between the positive and negative electrodes of C1 to charge C9 with the voltage of C1 to generate a DC voltage. A zener diode ZD3 is provided in parallel with C9 to regulate the voltage.

Figure 19:
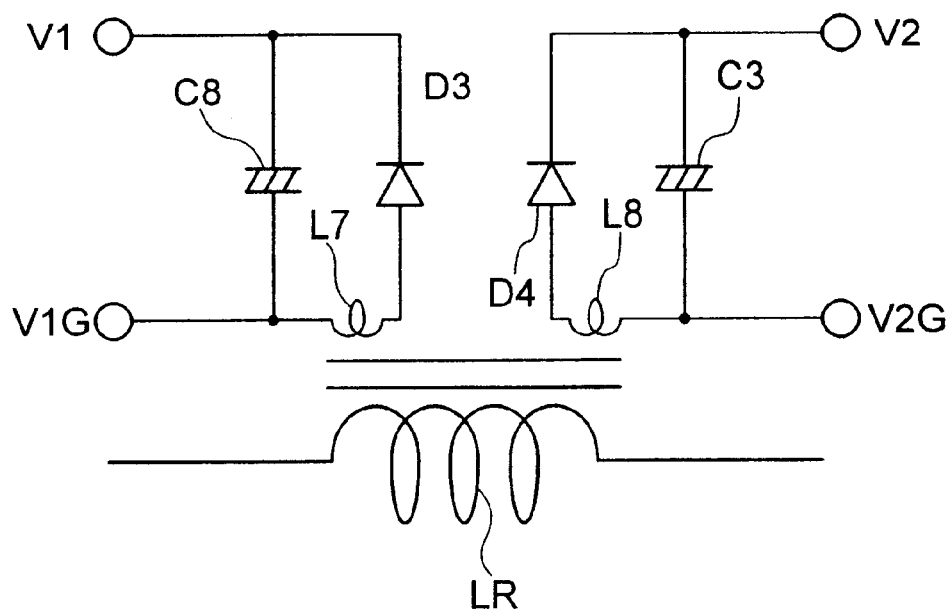
FIG. 19 is a diagram showing a modification of the power circuit of the device for turning on light shown in FIG. 17.

The reference potential of the control circuit 18 may be different from that of C1, as in the drive circuit 17. In this case, another secondary winding L8 is provided for the inductor LR as shown in FIG. 19, and the generated secondary voltage is used. A capacitor C3 is charged with this voltage via a diode D4, and the voltage across C3 is supplied to the node V2 of the drive circuit 17 and to the node V2G with the reference potential that is different from that of C1. During startup, the operation of the device for turning on light shown in FIG. 18 is the same as self-oscillation described in FIG. 8. That is, the switches Q1 and Q3 are alternately turned on and off to start the switching operation. After startup, the current flows into the resonance inductor LR to apply the DC voltage to the drive circuit 17, causing the drive circuit 17 to start separately-excited drive operation.

Figure 20:
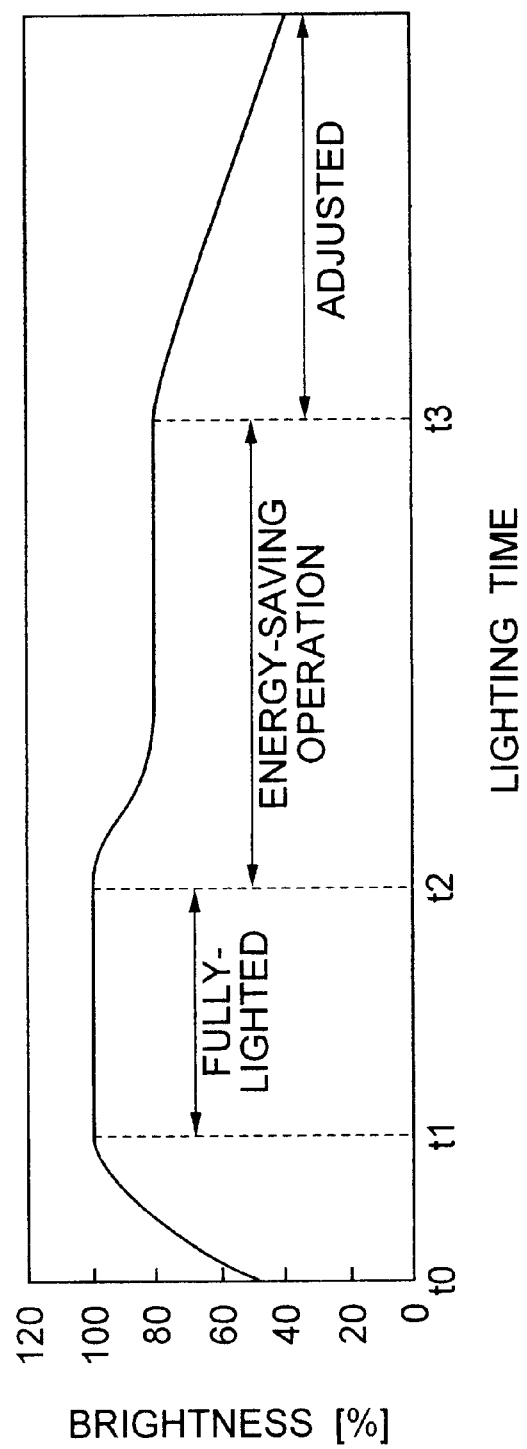
FIG. 20 is a diagram showing an example of a lighting control pattern of the device for turning on light with the communication function according to the present invention.

FIG. 20 is a diagram showing an example of a lighting control operation pattern in which the control unit controls the device for turning on light with the communication function described above. When the device starts lighting at time t0, the mercury-vapor pressure inside the discharge tube increases and, at the same time, the brightness gradually increases. At time t1, the discharge tube reaches 100% of fully-lighted state. Upon receiving an energy-saving operation mode signal from the control unit at time t2, the device for turning on light controls the switching frequency of the gate driving circuit to keep it higher than usual to slightly decrease the lamp power and maintains the brightness about 80% of the fully-lighted state. In this energy saving mode, the brightness of the discharge tube is about 20% lower than the fully-lighted state. The brightness is decreased not suddenly but gradually to make the user feel that it does not get dark. At time t3 when the control signal that further decreases the brightness of the discharge tube is sent, the device for turning on light increases the switching frequency to further decrease the lamp power for brightness adjustment. Controlling the device for turning on light via the control unit in this manner during the above-described energy-saving operation mode allows the brightness of the discharge tube to be adjusted to such an extent that the user does not notice that it gets darker and, at the same time, reduces the power consumption of the device for turning on light. Information on the state of the discharge tube, for example, information whether the lamp is present or the lamp is running down, helps the user do maintenance work such as the replacement of discharge tubes.

Figure 21:
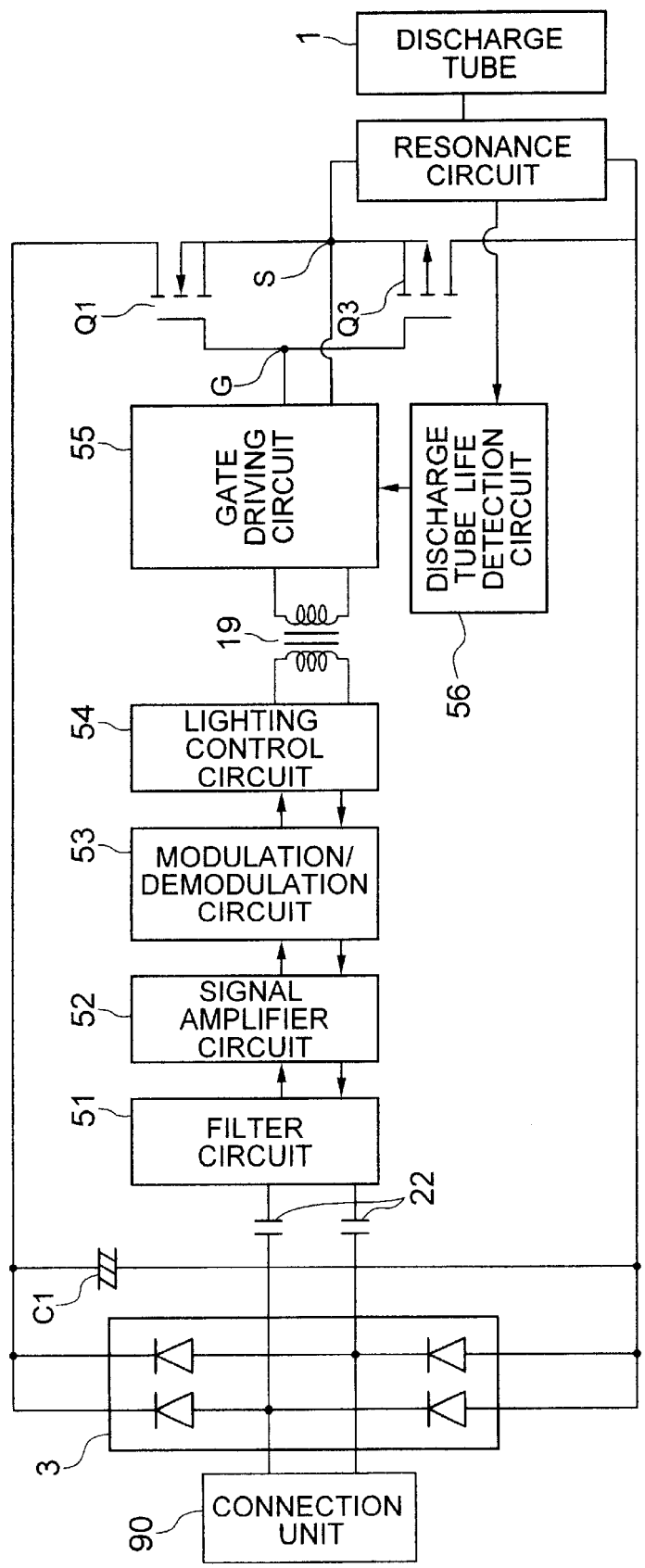
FIG. 21 is a circuit diagram showing a fourth embodiment of the device for turning on light with the communication function according to the present invention.

FIG. 21 is a circuit diagram of a fourth embodiment of a device for turning on light with the communication function according to the present invention. The device for turning on light comprises a filter circuit 51, a signal amplifier circuit 52, a modulation/demodulation circuit 53, a lighting control circuit 54, a gate driving circuit 55, and a discharge tube life detection circuit 56. In the device for turning on light shown in FIG. 17, the isolators between the communication interface and the inverter controller uses capacitors. In this embodiment, a transformer 19 is used as the isolator. When the transformer is used in this way, the lighting control circuit 54 in the communication interface decodes the digital signal from the modulation/demodulation circuit 53 and outputs the analog signal corresponding to the signal to the transformer 19. When the inverter state signal is sent from the inverter controller via the transformer 19, the lighting control circuit decodes the analog signal and outputs the digital signal to the modulation/demodulation circuit 53.

The gate driving circuit 55 receives the analog signal sent via the transformer 19, generates a desired frequency, and controls the switching frequency to adjust the brightness of the discharge tube 1. Upon receiving the signal from the discharge tube life detection circuit 56, the gate driving circuit stops oscillation to prevent the inverter from being damaged and, at the same time, outputs the analog signal corresponding to this state to the transformer 19.

The device according to the present invention allows the brightness of an inverter-type illumination apparatus to be adjusted without having to install an additional oscillation circuit. Also, the device allows the brightness of an inverter-type illumination apparatus to be adjusted remotely.

While the preferred form of the present invention has been described, it is to be understood that the present invention is not limited to the embodiments but that modifications will be apparent to those skilled in the art without departing from the spirit of the present invention.

What is claimed is:

1. A device for turning on light with a communication function, comprising:

an inverter generating a high-frequency current from a commercial AC voltage supplied from a lamp line and supplying the current to a discharge tube to be lighted; and a communication interface communicating with external units via the lamp line, wherein said inverter comprises:
DC voltage generating means for generating a DC voltage from the commercial AC voltage supplied from the lamp line;
switching means for switching the generated DC voltage and for supplying the high-frequency current to said discharge tube via a resonance circuit including a capacitor connected in parallel with said discharge tube; and
driving circuit means for controlling the switching of said switching means based on a signal supplied from external sources, and wherein said communication interface comprises:
filter means for extracting from the commercial AC voltage an analog signal including lighting control information and superposed on the commercial AC voltage;
means for generating a digital control signal sending at least one of switching start information, switching stop information, and switching frequency information to said driving circuit means based on information from said filter means; and
lighting control means for sending the digital control signal to said driving circuit means.

2. The device for turning on light according to claim 1, wherein said lighting control means further comprises storing means for storing therein a control pattern controlling the discharge tube in such a way that the discharge tube is lighted at a maximum luminous flux for a predetermined time after a start of lighting and, after the predetermined time, at a luminous flux lower than the maximum luminous flux.

3. An illumination apparatus comprising:
the device for turning on light according to claim 1; and
a connection unit connecting the device for turning on light to the lamp line,
wherein said connection unit comprises:
storing means storing therein a position at which said connection unit is installed; and
sending means for sending a signal indicating the installation position over the lamp line.

4. The illumination apparatus according to claim 3 wherein said connection unit further comprises means for generating a signal indicating that the device for turning on light has been connected and for sending the signal to said sending means.

5. The illumination apparatus according to claim 3 wherein said connection unit further comprises means for generating a signal indicating a current supplied from the lamp line and for sending the signal to said sending means.

6. The device for turning on light with a communication function according to claim 1, wherein said inverter further comprises a first sensor generating lighting state information as a digital lighting state signal and wherein said communication interface converts the digital lighting state signal, received from said first sensor, to an analog signal and superposes the signal on the commercial AC voltage for transmission to external units via the lamp line.

7. The device for turning on light with a communication function according to claim 6, wherein said inverter further comprises a second sensor detecting a presence of and a life running-down state of the discharge tube and wherein said communication interface converts the digital lighting state signal, including information detected by said first sensor and second sensor, to an analog signal, superposes the signal on the commercial AC voltage, and transmits the signal to external units via the lamp line.

8. The device for turning on light with a communication function according to claim 6, further comprising an isolator electrically separating said inverter and said communication interface.

9. The device for turning on light with a communication function according to claim 8, wherein said isolator comprises capacitors or a transformer.

10. The device for turning on light with a communication function according to claim 6, wherein said lighting control means and said gate driving circuit means comprise complementary signal generating means generating two complementary signals, which are 180° out of phase, and sending the signals as a control signal and a lighting state signal respectively and means for reproducing the control signal and the lighting state signal from the received complementary signals.

11. The device for turning on light with a communication function according to claim 10, further comprising capacitors separating said inverter and said communication interface, wherein said means for reproducing comprises a pair of detection circuits getting information on a rise and a fall of a pulse based on a differential waveform from the capacitors, a flip-flop reproducing the signal based on information from said detection circuit, and a buffer temporarily storing therein the reproduced signal.

* * * * *